United States Patent
Schultz et al.

(10) Patent No.: US 12,050,332 B2
(45) Date of Patent: Jul. 30, 2024

(54) WAVEGUIDE TURNING GRATING DESIGNS FOR OPTIMAL EFFICIENCY

(71) Applicant: Vuzix Corporation, West Henrietta, NY (US)

(72) Inventors: Robert J. Schultz, Victor, NY (US); Marek W. Kowarz, Henrietta, NY (US)

(73) Assignee: Vuzix Corporation, West Henrietta, NY (US)

( * ) Notice: Subject to any disclaimer, the term of this patent is extended or adjusted under 35 U.S.C. 154(b) by 795 days.

(21) Appl. No.: 17/257,133

(22) PCT Filed: Jun. 12, 2019

(86) PCT No.: PCT/US2019/036759
§ 371 (c)(1),
(2) Date: Dec. 30, 2020

(87) PCT Pub. No.: WO2020/009788
PCT Pub. Date: Jan. 9, 2020

(65) Prior Publication Data
US 2021/0231854 A1 Jul. 29, 2021

Related U.S. Application Data

(60) Provisional application No. 62/693,253, filed on Jul. 2, 2018.

(51) Int. Cl.
*G02B 5/18* (2006.01)
*F21V 8/00* (2006.01)
*G02B 5/32* (2006.01)

(52) U.S. Cl.
CPC .............. *G02B 5/32* (2013.01); *G02B 5/1842* (2013.01); *G02B 6/0023* (2013.01); *G02B 6/005* (2013.01)

(58) Field of Classification Search
CPC ...... G02B 5/32; G02B 5/1842; G02B 6/0023; G02B 6/005; G02B 6/34;
(Continued)

(56) References Cited

U.S. PATENT DOCUMENTS 10,444,510 B1 * 10/2019 Lee ..................... G02B 27/0172
10,670,876 B2 * 6/2020 Popovich ............. G02B 6/0038
(Continued)

FOREIGN PATENT DOCUMENTS

CN 107209365 A 9/2017
CN 107329261 A 11/2017
(Continued)

OTHER PUBLICATIONS

Harvey et al., "Description of Diffraction Grating Behavior in Direction Cosine Space," Applied Optics (1998), p. 8158-8160, vol. 37(34).

(Continued)

*Primary Examiner* — Mustak Choudhury
(74) *Attorney, Agent, or Firm* — Harter Secrest & Emery LLP; Jacob D. Merrill, Esq.

(57) ABSTRACT

An imaging apparatus includes an in-coupling diffractive optic directs image-bearing light beams into a planar waveguide, an out-coupling diffractive optic directs the image-bearing light beams from the waveguide toward a viewer eyebox, and a turning diffractive optic directs the image-bearing light beams along the waveguide between the in-coupling and out-coupling diffractive optics. The grating vectors of the in-coupling and out-coupling diffractive optics differ in magnitude and orientation while the grating vectors of all three diffractive optics sum to substantially zero. The turning diffractive optic is further arranged to preserve a desired angular relationship of the propagating image bearing beams within the waveguide.

20 Claims, 5 Drawing Sheets

(58) Field of Classification Search
CPC ........ G02B 2027/0174; G02B 27/0172; G03H 2223/16; G03H 2001/2226
See application file for complete search history.

(56) References Cited

U.S. PATENT DOCUMENTS

| | | | |
|---|---|---|---|
| 2003/0202247 A1 | 10/2003 | Niv et al. | |
| 2007/0188837 A1 | 8/2007 | Shimizu et al. | |
| 2009/0303599 A1 | 12/2009 | Levola | |
| 2016/0320536 A1 | 11/2016 | Simmonds et al. | |
| 2017/0075119 A1 | 3/2017 | Schultz et al. | |
| 2017/0322426 A1* | 11/2017 | Tervo | G02B 27/4272 |
| 2018/0172995 A1 | 6/2018 | Lee et al. | |
| 2018/0210205 A1* | 7/2018 | Grey | G02B 27/0081 |

FOREIGN PATENT DOCUMENTS

| | | |
|---|---|---|
| CN | 108139593 A | 6/2018 |
| EP | 2887119 A1 | 6/2015 |
| JP | 2005524096 A | 8/2005 |
| JP | 2017504063 A | 2/2017 |
| JP | 2017528739 A | 9/2017 |
| WO | 2015091277 | 6/2015 |
| WO | 2016020643 A1 | 2/2016 |
| WO | 2017044873 A1 | 3/2017 |
| WO | 2017120326 A1 | 7/2017 |
| WO | 2017120341 A1 | 7/2017 |
| WO | 2018198587 A1 | 3/2018 |

OTHER PUBLICATIONS

Liu et al., "Total internal reflection diffraction grating in conical mounting and its application in planar display," Proc. of SPIE (2015), p. 944914-1-949914-6, vol. 9449, The International Conference on Photonics and Optical Engineering.

International Searching Authority, International Search Report and Written Opinion from corresponding International Application No. PCT/US2019/036759, mailed Aug. 29, 2019.

* cited by examiner

WAVEGUIDE TURNING GRATING DESIGNS FOR OPTIMAL EFFICIENCY

TECHNICAL FIELD

This invention generally relates to near-eye displays and more particularly relates to such displays that use an image light guide to convey virtual image content to a viewer.

BACKGROUND

Head-Mounted Displays (HMDs) are being developed for a range of diverse uses, including military, commercial, industrial, fire-fighting, and entertainment applications. For many of these applications, there is value in forming a virtual image that can be superimposed over the real-world image that lies in the field of view of the HMD user. See-through optical image light guides (also called pupil expanders) can convey virtual images from temple-mounted projectors to a position aligned with the viewer's pupil, enabling this superposition function.

The virtual images can be conveyed along the image light guides as a set of overlapping angularly related beams corresponding to pixels of a two-dimensional image. The image light guides participate in forming an exit pupil of an imaging system in a position that allows a viewer's eye to view the image content at an infinite or nearer focus position within the viewer's field of view through the light guide.

In a conventional form, the light guides are formed from planar waveguides with plane-parallel inner and outer surfaces; the inner surface facing the viewer and the outer surface facing the environment containing the viewer's field of view through the waveguide. Collimated, angularly related light beams from an image source are coupled into the waveguide by an input coupling (also called an in-coupling optic) such as an in-coupling diffractive optic, which can be mounted or formed on either surface of the waveguide or buried within the waveguide. Such diffractive optics can be formed as diffraction gratings, holographic optical elements or in other known ways. For example, the diffraction grating can be formed by surface relief.

The angularly related beams are coupled into the waveguide in an orientation that allows the beams to propagate along the waveguide by the mechanism of total internal reflection (TIR), i.e., internal reflections from the inner and outer surfaces of the waveguide. The reorientation of the beams, such as by the mechanism of diffraction, can change the angular relationships among the beams as well as among beam portions of different wavelengths. However, the changes in the angular relationships are systematic rather than random and can therefore be referred to as angular encoding.

After propagating along a length of the waveguide to a position in front of the viewer's eye, the angularly encoded beams can be both decoded and output from the waveguide through an out-coupling optic for forming an exit pupil of the imaging system in a position at which the viewer's eye can form the desired virtual image. The out-coupling optic can be an out-coupling diffractive optic that matches the in-coupling diffractive optic to systematically decode the relative angular changes in the beams and different wavelength beam portions imposed by the in-coupling diffractive optic and restore the original angular relationships among the beams representing different pixel positions within an image.

The region within which the exit pupil is formed, which is also referred to as an eyebox, can be quite small, limiting the range of positions at which the viewer's eye can be located relative to the light guide for viewing the virtual image. To enlarge the eyebox, multiple internal reflections of the angularly encoded beams along the waveguide can be exploited together with a limited efficiency of the out-coupling optic, e.g. a limited diffraction efficiency, to output each of the angularly related beams as a succession of beamlets occupying larger total areas. For example, during a first encounter of an internally reflected beam with an out-coupling diffractive optic, a portion of a beam's energy can be diffracted out of the waveguide through a desired first order of diffraction and a second portion of the beam's energy can be internally reflected on its original path through a zero order of diffraction. Second and subsequent encounters with the internally reflected beam can diffract additional portions of the beam's energy from the waveguide at relatively displaced positions along the waveguide thereby expanding the area over which each beam can contribute to forming the exit pupil.

Out-coupling diffractive optics with refractive index variations along a single dimension can expand one dimension of the eyebox by expanding the individual angularly related beams in their direction of propagation along the waveguide between encounters with the out-coupling diffractive optic. In addition, an optional turning optic can be positioned along the waveguide optically between the in-coupling and out-coupling optics to expand a second dimension of the eyebox, and when combined with the expansion of the out-coupling optic, provides two-dimensional expansion of the eyebox. As a diffractive optic with refractive index variations along a single dimension, the turning optic can be arranged to diffract a portion of each beam's energy upon each encounter through a desired first order of diffraction in a direction toward the out-coupling optic while another portion of the beam's energy is preserved for further propagation in its original direction through a zero order of diffraction. Repeated encounters spread the encoded beams approaching the out-coupling optic.

The range of angularly related beams representing the virtual image's field of view can be limited by the range of angularly encoded beams that can be conveyed along the waveguide by TIR. For example, the minimum incidence angle for TIR, known as the critical angle, is based on refractive index differences at an interface between the waveguide (e.g., glass or plastic) and its immediate surroundings (e.g., air). The maximum incidence angle can be limited by the desired number of encounters of the associated beam with each of the out-coupling optic and the turning optic. To make maximum use of the available TIR angles, the angularly related beam corresponding to a pixel near the center of the image (accounting for nonlinearities) can be diffracted into the waveguide at an optimal angle for centering the range of angularly encoded beams within the range of available TIR angles. Thus, in a preferred form the optimal angle can be associated with the angularly encoded beam that bifurcates both the range of angularly related beams and the range of available TIR angles.

The available designs for positioning the in-coupling, turning, and out-coupling optics along the waveguide and for accommodating different overall directions at which the incoming and outgoing angularly related beams enter and exit the waveguide is constrained by the requirement for the in-coupling and out-coupling diffractive optics to match or at least mirror each other to preserve the angular relationships among the angularly related beams that constitute the virtual image. As diffractive optics, the pitch (i.e., spacing) of the diffractive features of the in-coupling diffractive optic match the pitch of the diffractive features of the out-coupling diffractive optic so that whatever systematic encoding produced by the in-coupling diffractive optic is decoded by the out-coupling diffractive optic. The matching relationship, while avoiding distortions and chromatic errors, imposes physical and functional limitations on the available light guide designs.

SUMMARY

Embodiments expand design opportunities for constructing image light guides for conveying virtual images in near-eye displays. The image light guides encode angularly related beams conveying the virtual images upon entering a waveguide and decode the encoded angularly related beams upon exiting the waveguide but do not require out-coupling diffractive optics to match or otherwise mirror in-coupling diffractive optics. Instead, the angular encoding imposed by the in-coupling diffractive optic is decoded by a coordinated operation of a turning diffractive optic with the out-coupling diffractive optic. Together, the in-coupling, turning, and out-coupling diffractive optics allow the angular relationships among beams of different wavelengths defining a virtual image to be preserved upon conveyance by an image light guide from an offset position to a near-eye position of the viewer. The expanded design possibilities allow for the in-coupling, turning, and out-coupling diffractive optics to be relatively positioned and oriented in different ways to control the overall shape of the waveguide as well as the overall orientations at which the angularly related beams can be directed into and out of the waveguide.

The new design possibilities also accommodate desired expansions of the eyebox in two dimensions to reduce sensitivities for aligning the eyebox with a viewer's eye and can also support the conveyance of a wide range of angularly related beams along the waveguide. For example, the turning diffractive optic can be optimized for maintaining the angularly related beams in an optimal form for further propagation along the waveguide to the out-coupling diffractive optic.

An image light guide according to various embodiments includes a waveguide together with in-coupling, turning, and out-coupling diffractive optics. The waveguide has a transparent substrate and inner and outer surfaces oriented in parallel to a plane of the waveguide. The in-coupling diffractive optic is positioned on or within the waveguide and is arranged to diffract a range of angularly related image-bearing light beams representing a virtual image into the waveguide for propagation along the waveguide. The out-coupling diffractive optic is positioned on or within the waveguide and is arranged to diffract the propagating image-bearing light beams from the waveguide toward a viewer eyebox. The turning diffractive optic is positioned on or within the waveguide and is arranged to diffract the propagating image-bearing light beams from the in-coupling diffractive optic toward the out-coupling diffractive optic. The in-coupling, turning, and out-coupling diffractive optics are defined by respective grating vectors in the plane of the waveguide, each having an orientation normal to a periodic array of features and a length that is inversely proportional to a pitch of the features. The grating vectors of the in-coupling and out-coupling diffractive optics have different lengths, and the grating vectors of the in-coupling, turning, and out-coupling diffractive optics sum to substantially zero.

The angularly related image-bearing light beams representing a virtual image are angularly encoded by the in-coupling diffractive optic for propagation along the waveguide. The turning diffractive optic participates in a further encoding of the beams propagating along the waveguide in a manner that is coordinated with the decoding of the angularly related beams performed by the out-coupling diffractive optic so that together, the turning diffractive optic and the out-coupling diffractive optic effectively decode the angularly related beams exiting the waveguide.

The angularly encoded beams generally propagate along the waveguide by the mechanism of total internal reflection or other forms of reflection from the plane parallel front and back surfaces of the waveguide. As such, the mode of propagation sets limits on the range of angles over which the angularly related beams can be conveyed. For example, total internal reflection fails at incidence angles below a certain critical angle, and incidence angles approaching complementary low grazing angles may fail to encounter the turning and out-coupling diffractive optics a desired number of times for supporting beam expansions. The in-coupling diffractive optic encodes the angularly related beams for propagation within the acceptable range of angles that can be conveyed as desired along the waveguide. The turning optic, although arranged to participate in the further encoding of the angularly related beams, is preferably further optimized to preserve polar angle components of the angularly encoded beams to maintain the angularly related beams within the acceptable range of angles that can be conveyed as desired along the waveguide.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
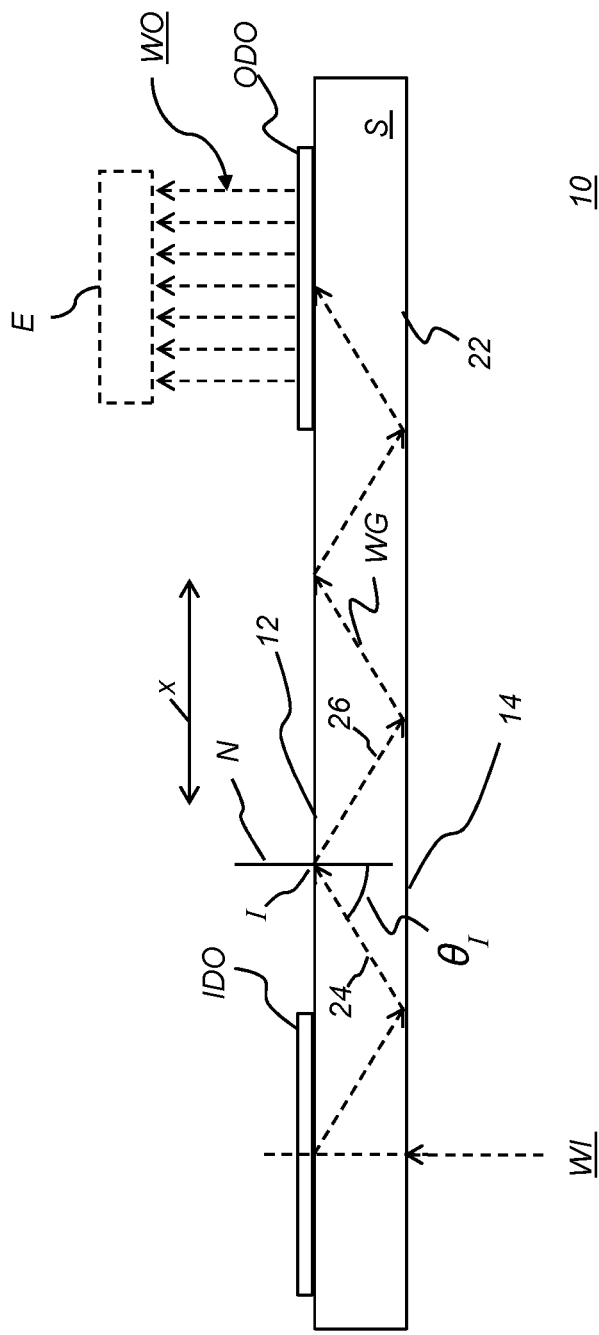
FIG. 1 is a schematic diagram that shows a simplified cross-sectional view of an image light guide providing one dimension of pupil expansion.

The present description references elements forming part of, or cooperating more directly with, apparatus in accordance with the invention. It is to be understood that the elements discussed may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer" and "user" are equivalent and refer to the person who views images through the image light guide.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

As an alternative to real image projection, an optical system can produce a virtual image projection. In contrast to the projection of a real image, a virtual image is not formed on a display surface. That is, if a display surface were positioned at the perceived location of a virtual image, no image would be formed on that surface. Virtual image projection has several inherent advantages for augmented reality display. For example, the apparent size of a virtual image is not limited by the size or location of a display surface and a more realistic viewing experience can be provided by forming a virtual image that appears to be some distance away within the field of view of the viewer. Providing a virtual image also avoids the deleterious effects of screen artifacts on the formation of real images.

The phrases "optical infinity" and "at infinity" as used herein corresponds to conventional usage in the camera and imaging arts, indicating image formation using substantially collimated light, so that the focus distance exceeds at least about 4 m.

The terms "coupled" or "coupler" in the context of optics refers to a connection by which light travels from one optical medium or device to another optical medium or device through an intermediate structure that facilitates the connection.

The terms "image light guide", "light guide", "beam expander", "exit pupil expander", and "pupil expander" are considered to be synonymous and used interchangeably herein. Image light guides include waveguides, which are preferably optically transparent and can have an index of refraction greater than their ambient environment. In a preferred form, the waveguides can include a transparent substrate with two optically flat plane parallel surfaces through which the viewer can see the ambient environment in front of the waveguide. The image light guide can be used for such purposes as 1) laterally translating the exit pupil of an optical system to a position where it can be directed towards a user's eye or to another optical system; and 2) expanding exit pupil of the optical system.

The pitch of a diffractive optic, such as a diffraction grating, is the spacing between the centers of features, such as marks or grooves, exhibiting a variation in refractive index. A diffractive optic may be described by a so-called grating vector. The grating vector is located in the plane of the diffractive optic, extends in a direction that is normal to the features of the diffractive optic, and has a magnitude inversely proportional to the pitch.

With a one-dimensional pupil expanding system, the in-coupling and out-coupling diffractive optics can have equal grating vectors that extend parallel to each other. Image bearing beams can be expanded along their direction of travel, particularly upon encountering the out-coupling diffractive optic. With two-dimensional pupil expanding system, the image bearing light travels along at least two different directions within the waveguide before reaching the out-coupling diffractive optic where the light is directed out of the waveguide. Pupil expansion can occur in both directions of travel, first by a turning diffractive optic, which can redirect the image bearing beams in the second direction within or beyond the turning diffractive optic, and second by the out-coupling diffractive optic. Two-dimensional pupil expansion can also occur within the out-coupling diffractive optic, particularly if defined by multiple grating vectors.

In "even" pupil expanders, light beams propagate to and from a turning diffractive optic in the same direction as their further propagation into an initial encounter with the out-coupling diffractive optic. However, portions of the image bearing light can be redirected in another direction within the turning optic. In "odd" pupil expanders, light beams propagate to and from the turning diffractive optic in different directions with the light beams leaving the turning diffractive optic in a direction for encountering the out-coupling diffractive optic.

FIG. 1 is a schematic diagram showing a simplified cross-sectional view of one conventional configuration of a monocular type image light guide 10 comprising a planar waveguide 22 having a transparent substrate S, plane-parallel inner and outer surfaces 12 and 14, an in-coupling diffractive optic IDO, and an out-coupling diffractive optic ODO. In this example, in-coupling diffractive optic IDO is shown as a reflective type diffraction grating arranged on the inner surface 12 of the planar waveguide 22 opposite to the outer surface 14 of the planar waveguide 22 through which image-bearing light WI approaches the planar waveguide 22. However, in-coupling diffractive optic IDO could alternately be a transmissive diffraction grating, volume hologram or other holographic diffraction element, or other type of optical component that provides diffraction for the incoming, image-bearing light WI. The in-coupling diffractive optic IDO can be located on the inner or outer surface 12 or 14 of the planar waveguide 22 and can be of a transmissive or reflective type in a combination that depends upon the direction from which the image-bearing light WI approaches the planar waveguide 22.

When used as a part of a virtual display system, in-coupling diffractive optic IDO couples the image-bearing light WI from a real, virtual or hybrid image source (not shown) into the substrate S of the planar waveguide 22. Any real image or image dimension is first converted, e.g. converged toward a focus, into an array of overlapping angularly related beams corresponding to the different pixels of a virtual image for presentation to the in-coupling diffractive optic IDO. Typically, the rays within each bundle forming one of the angularly related beams extend in parallel, but the angularly related beams are relatively inclined to each other through angles that can be defined in two angular dimensions corresponding to linear dimensions of the image.

The image-bearing light WI is diffracted (generally through a first diffraction order) and is thereby redirected by in-coupling diffractive optic IDO into the planar waveguide 22 as image-bearing light WG for further propagation along the planar waveguide 22 by total internal reflection (TIR). Although diffracted into a different combination of angularly related beams in keeping with the boundaries set by TIR, the image-bearing light WG preserves the image information in an encoded form that is derivable from the parameters of the in-coupling diffractive optic IDO. An out-coupling diffractive optic ODO receives the encoded image-bearing light WG and diffracts (also generally through a first diffraction order) the image-bearing light WG out of the planar waveguide 22 as the image-bearing light WO toward the intended location of a viewer's eye. The out-coupling diffractive optic ODO is designed symmetrically with respect to the in-coupling diffractive optic IDO to restore the original angular relationships of the image-bearing light WI among outputted angularly related beams of the image-bearing light WO. In addition, the out-coupling diffractive optic ODO can modify the original field points' positional angular relationships producing an output virtual image focused at a finite distance.

The out-coupling diffractive optic ODO is shown as a transmissive type diffraction grating arranged on the inner surface 12 of the planar waveguide 22. However, like the in-coupling diffractive optic IDO, the out-coupling diffractive optic ODO can be located on the inner or outer surface 12 or 14 of the planar waveguide 22 and be of a transmissive or reflective type in a combination that supports the intended direction through which the image-bearing light WO exits the planar waveguide 22.

To increase one dimension of overlap among the angularly related beams in a so-called eyebox E within which the virtual image can be seen, the out-coupling diffractive optic ODO is arranged to encounter the image-bearing light WG multiple times and to diffract only a portion of the image-bearing light WG upon each encounter. The multiple encounters along the length of the out-coupling diffractive optic ODO have the effect of enlarging one dimension of each of the angularly related beams of the image-bearing light WO thereby expanding one dimension of the eyebox E within which the beams overlap. The expanded eyebox E decreases sensitivity to the position of a viewer's eye for viewing the virtual image.

As is known to those skilled in the art, the critical angle $\theta_C$ for TIR to occur within the substrate S, having an index of refraction $n_1$ surrounded by a medium, such as air, having an index of refraction $n_2$ with $n_1 > n_2$ is given by the expression:

$$\theta_C = \sin^{-1}\left(\frac{n_2}{n_1}\right).$$

Referring to FIG. 1, a light ray 24 within substrate S having an angle of incidence $\theta_I$, with respect to the surface normal N at the ray intersection point I of the substrate S inner surface 12 will be reflected from the inner surface 12 when $\theta_I > \theta_C$ to become reflected light ray 26 propagating within the substrate S.

Figure 2:
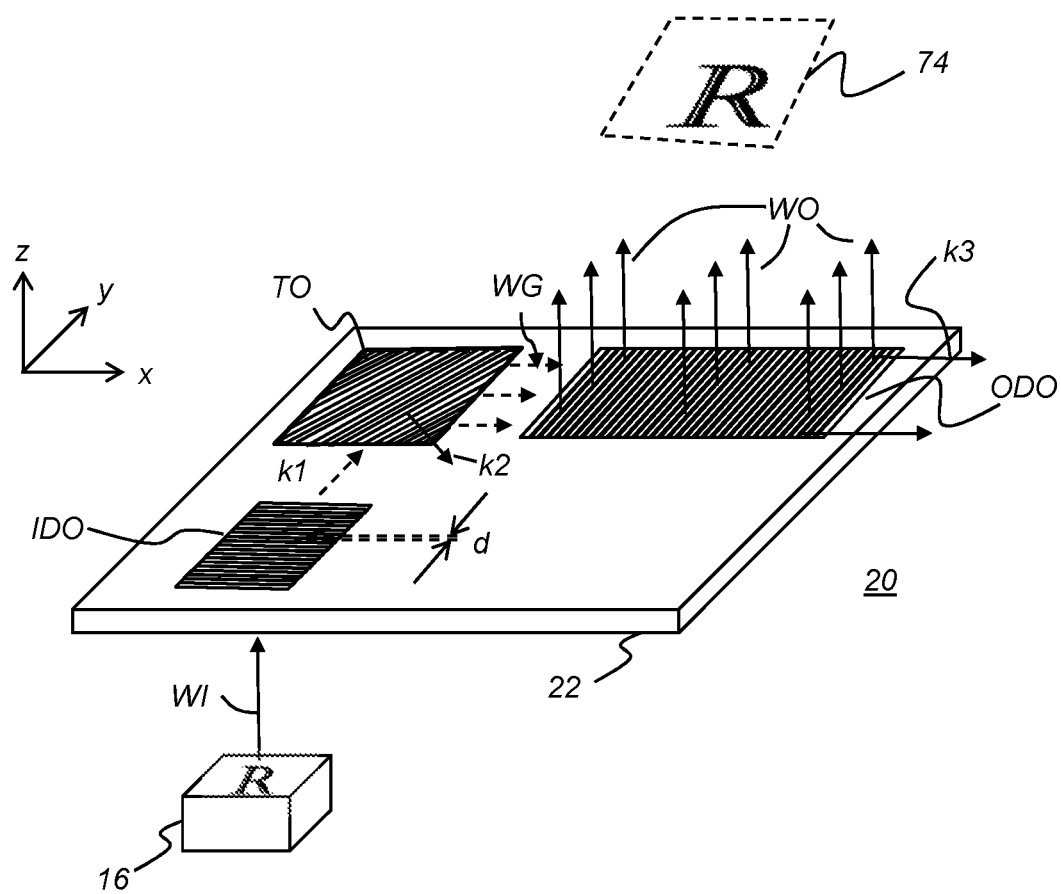
FIG. 2 is a perspective view of an image light guide providing two dimensions of pupil expansion.

The perspective view of FIG. 2 shows an image light guide 20 that is arranged for expanding an eyebox 74 in two dimensions, i.e., along both x- and y-axes of the intended image. To achieve a second dimension of beam expansion, the in-coupling diffractive optic IDO is oriented to diffract the image-bearing light WI about a grating vector k1 toward a turning diffractive optic in the form of turning optic TO, whose grating vector k2 is oriented to diffract the image-bearing light WG in a reflective mode toward the out-coupling diffractive optic ODO. Only a portion of the image-bearing light WG is diffracted by each of multiple encounters with the turning optic TO thereby laterally expanding each of the angularly related beams of the image-bearing light WG approaching the out-coupling diffractive optic ODO. The turning optic TO redirects the image-bearing light WG into an at least approximate alignment with a grating vector k3 of the out-coupling diffractive optic ODO for longitudinally expanding the angularly related beams of the image-bearing light WG in a second dimension before exiting the planar waveguide 22 as the image-bearing light WO. Grating vectors, such as the depicted grating vectors k1, k2, and k3, are in a plane parallel to the planar waveguide 22 and point in directions normal to their respective diffractive features (e.g., grooves, lines, or rulings) of the diffractive optics and have magnitudes inversely proportional to the period or pitch d (i.e., the on-center distance between grooves) of the respective diffractive optics IDO, TO, and ODO.

The image light guides 20 depicted in FIG. 2, like the light guide 10 of FIG. 1, can be of a type used in a many different head-mounted device (HMD) designs for providing image content to a viewer. This type of image light guide is also particularly well suited to augmented reality applications in which virtual image content can be superimposed on a real-world view as seen through the transparent planar waveguide 22.

In the image light guide 20 of FIG. 2, in-coupling diffractive optic IDO receives the incoming image-bearing light WI containing a set of angularly related beams corresponding to individual pixels or equivalent locations within an image generated by an image source 16. A full range of angularly encoded beams for producing a virtual image can be generated by a real display together with focusing optics, by a beam scanner for more directly setting the angles of the beams, or by a combination such as a one-dimensional real display used with a one-dimensional scanner. The image light guide 20 outputs a laterally expanded set of angularly related beams in two dimensions of the image by providing multiple encounters of the image-bearing light WG with both the turning optic TO and the out-coupling diffractive optic ODO in different orientations. As shown within the planar waveguide 22, the turning optic TO provides beam expansion in the y-axis direction, and the out-coupling diffractive optic ODO provides a similar beam expansion in the x-axis direction. The reflectivity characteristics and respective periods d of the two diffractive optics IDO and ODO and the turning optic TO, together with the orientations of their respective grating vectors, provide for beam expansion in two dimensions while substantially preserving the intended relationships among the angularly related beams of the image-bearing light WI that are output from the image light guide 20 as the image-bearing light WO.

That is, while the image-bearing light WI input into the image light guide 20 is encoded into a different set of angularly related beams by the in-coupling diffractive optic IDO, the information required to reconstruct the image can be substantially preserved by accounting for the systematic effects of the in-coupling diffractive optic IDO. The turning optic TO, located in an intermediate position between the in-coupling and out-coupling diffractive optics IDO and ODO, can be arranged so that it does not induce significant changes to the encoding of the image-bearing light WG. As such, the out-coupling diffractive optic ODO can be arranged in a symmetric fashion with respect to the in-coupling diffractive optic IDO, e.g., including diffractive features sharing the same period. Similarly, the period of the turning optic TO can also match the common period of the in-coupling and out-coupling diffractive optics IDO and ODO. Although the grating vector k2 of the turning optic TO is shown oriented at 45 degrees with respect to the other grating vectors, which remains a possible orientation, the grating vector k2 of the turning optic TO can be oriented at 60 degrees to the grating vectors k1 and k3 of the in-coupling and out-coupling diffractive optics IDO and ODO in such a way that the image-bearing light WG is turned 120 degrees. By orienting the grating vector k2 of the turning optic TO at 60 degrees with respect to the grating vectors k1 and k3 of the in-coupling and out-coupling diffractive optics IDO and ODO, the grating vectors k1 and k3 of the in-coupling and out-coupling diffractive optics IDO and ODO are also oriented at 60 degrees with respect to each other. Basing the grating vector magnitudes on the common pitch shared by the turning optic TO and the in-coupling and out-coupling diffractive optics IDO and ODO, the three grating vectors k1, k2, and k3 (as directed line segments) form an equilateral triangle, and sum to a zero vector magnitude, which avoids asymmetric effects that could introduce unwanted aberrations including chromatic dispersion.

The image-bearing light WI that is diffracted into the planar waveguide 22 is effectively encoded by the in-coupling optic, whether the in-coupling optic uses gratings, holograms, prisms, mirrors, or some other mechanism. Any reflection, refraction, and/or diffraction of light that takes place at the input must be correspondingly decoded by the output to re-form the virtual image that is presented to the viewer. The turning optic TO, placed at an intermediate position between the in-coupling and out-coupling diffractive optics IDO and ODO, can be designed and oriented so that it does not induce any substantial change on the encoded light. Out-coupling diffractive optic ODO decodes the image-bearing light WG into its original or desired form of angularly related beams that have been expanded to fill the eyebox 74.

The letter "R" represents the orientation of the virtual image that is visible to the viewer whose eye is in the eyebox 74. As shown, the orientation of the letter "R" in the represented virtual image matches the orientation of the letter "R" as encoded by the image-bearing light WI. A change in the rotation about the z axis or angular orientation of incoming image-bearing light WI with respect to the x-y plane causes a corresponding symmetric change in rotation or angular orientation of outgoing light from out-coupling diffractive optic ODO. From the aspect of image orientation, the turning optic TO can act as a type of optical relay, providing expansion of the angularly encoded beams of the image-bearing light WG along one axis (e.g., along the y axis) of the image. Out-coupling diffractive optic ODO further expands the angularly encoded beams of the image-bearing light WG along another axis (e.g., along the x axis) of the image while maintaining the original orientation of the virtual image encoded by the image-bearing light WI. Like the in-coupling and out-coupling diffractive optics, the turning optic TO can take several forms and can be a slanted or square grating or, alternately, can be a blazed grating and can be arranged on the inner or outer surfaces of the planar waveguide 22.

Figure 3A:
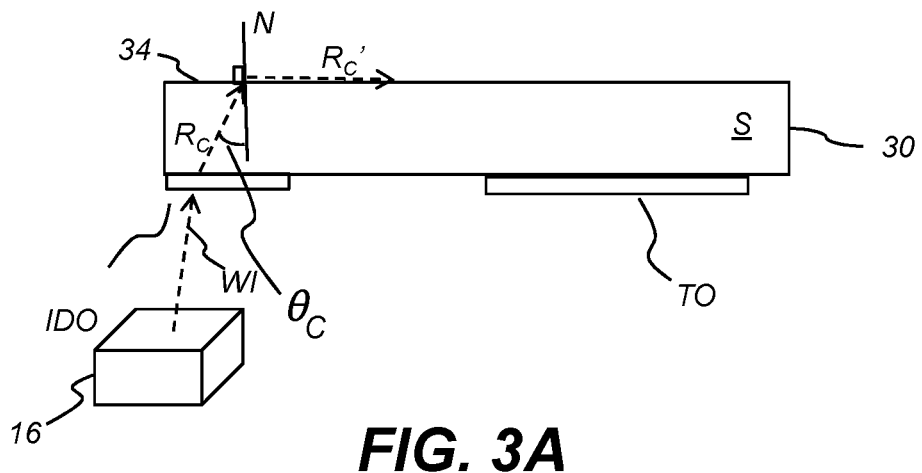
FIGS. 3A and 3B illustrate critical and extreme angles associated with the propagation of angularly related image bearing beams by the mechanism of total internal reflection along a waveguide.

The diagram of FIG. 3A illustrates the TIR (total internal reflection) critical angle $\theta_C$ as a polar angle of a ray $R_C$ representing one of the parallel rays within an angularly encoded beam that might be diffracted through the transmissive in-coupling diffractive optic IDO into the substrate S of the waveguide 30. The term polar angle, as designated by the subscripted Greek letter $\theta$, is defined as an angle between an indicated ray $R_C$ of an angularly related beam and a normal to its incident surface, i.e., outer surface 34, of the waveguide 30. The ray $R_C$, after in-coupling, propagates to the outer surface 30 where, because the polar angle of incidence is at the TIR critical angle $\theta_C$, the continuing ray $R_C'$ is not reflected into the substrate S but instead propagates nominally parallel to the outer surface 34. Thus, the polar angle $\theta$ of rays within an angularly encoded beam intended for further propagation along the waveguide 30 by TIR must be greater than the critical angle $\theta_C$.

Figure 3B:
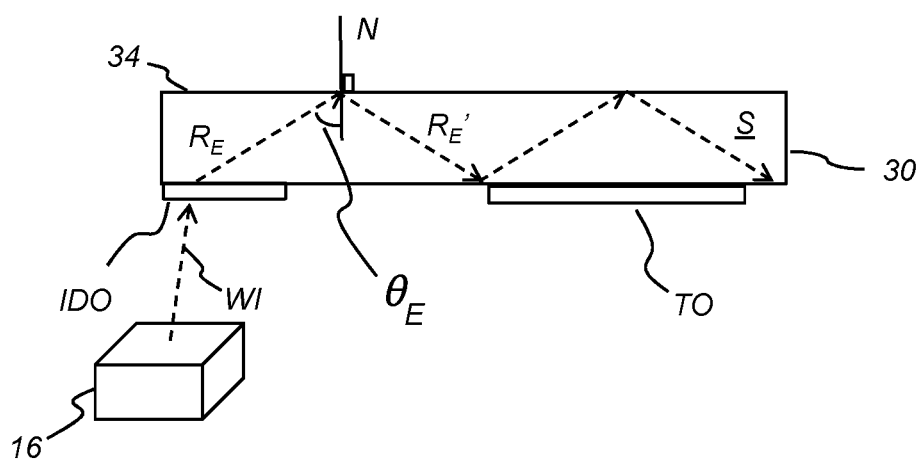

The diagram of FIG. 3B illustrates one way of defining an excessive polar angle $\theta_E$. The ray $R_E$ represents one of the parallel rays within another angularly encoded beam that might be diffracted through the in-coupling diffractive optic IDO into the substrate S of the waveguide 30. The ray $R_E$ approaches the parallel outer surface 34 of the waveguide 30 at a polar angle $\theta_E$, which is greater than the critical angle $\theta_C$, and is therefore subject to further propagation along the waveguide by TIR. However, the polar angle $\theta_E$ is so large in relation to the thickness of the waveguide 30, which is itself shown enlarged for purposes of illustration, that the continuing ray $R_E'$ misses any encounter with the turning diffractive optic, referenced as the turning optic TO. More precisely, the extreme polar angle $\theta_E$ can be defined as the polar angle at which the reflected rays of an angularly encoded beam propagating along the waveguide 30 miss a required encounter with the turning optic TO or out-coupling diffractive optic ODO (not shown). Thus, the polar angle $\theta$ of rays within an angularly encoded beam intended for encountering the turning optic TO or out-coupling diffractive optic ODO must be less than the extreme polar angle $\theta_E$. The range of acceptable polar angles $\theta_I$, can be described by the following expression:

$$\theta_C < \theta_I < \theta_E.$$

For further defining the turning optic TO, a ray $R_0$ can be identified corresponding to an angularly encoded beam representing a pixel near the center of the virtual image and having an optimal polar angle $\theta_O$ that bifurcates the acceptable range of polar angles as described by the following expression:

$$\theta_O \equiv \frac{\theta_C + \theta_E}{2}.$$

The polar angle $\theta_O$, which as defined above, bifurcates the intended range of the angularly related beams that are set to satisfy the expression for Bi and thus generally corresponds to an angularly related beam representing a pixel near the center of the virtual image. The tolerance for the polar angle $\theta_O$ is based on the range of angularly related beams required to fit within the range defined by the expression $\theta_C < \theta_I < \theta_E$ and is generally within a range of plus or minus 2 degrees. The turning optic TO can also be optimized for this angle to balance the intended performance of the turning optic TO over the wider range of angularly related beams. The polar angle $\theta_O$ can also represent the polar angle about which diffraction efficiency is optimized. Additionally, keeping the TIR polar angles approximately equal to the optimal polar angle $\theta_O$ allows for small variations of the angle of incidence that may occur due to manufacturing variability, or environmental variability, e.g. temperature variations, while still providing acceptable diffraction grating efficiency and image quality.

Figure 4A:
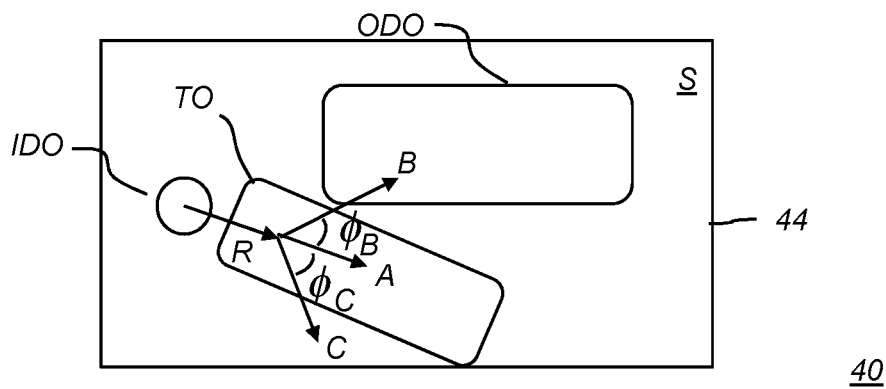
FIG. 4A shows one possible arrangement of the in-coupling, turning, and out-coupling diffractive optics.

FIG. 4A is a top view of an image light guide 40 comprising an in-coupling diffractive optic IDO, a turning optic TO and an out-coupling diffractive optic ODO. An in-coupled ray R is diffracted by the turning optic TO into at least three rays, A, B, C, propagating within the substrate S of the waveguide 44. Ray A is the zero-order diffracted ray, and rays B and C are the +1 and -1 order diffracted rays. The first order diffracted ray B is turned by the turning optic TO through azimuthal angle $\phi_B$ and the first order diffracted ray C is turned by the turning optic TO through azimuthal angle $\phi_C$.

Figure 4B:
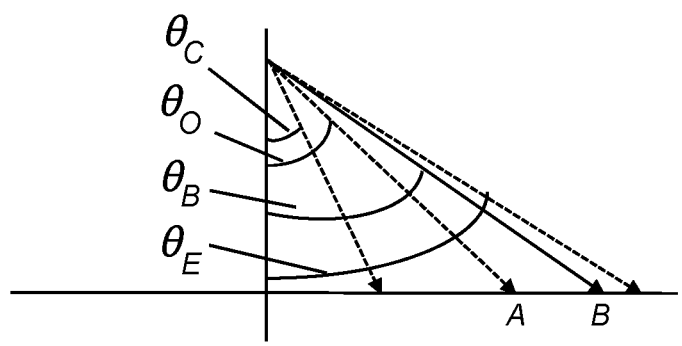
FIG. 4B is a graph illustrating the polar angles associated with diffractive encounters along the waveguide.

FIG. 4B is a graphic representation of the turning optic TO diffraction polar angles of interest. Polar angle $\theta_C$ is the critical angle, polar angle $\theta_E$ is the extreme polar angle, and polar angle $\theta_O$ is the optimal polar angle as defined previously. Polar angle $\theta_B$ is the polar angle through which ray B has been diffracted.

When the ray R interacts with the turning optic TO, the zero-order diffracted ray A is reflected into substrate S at the same polar angle as its polar angle of incidence and in the same plane formed by the incident ray R and the surface normal at the point of interaction (i.e., as if the turning optic TO were not present). However, the first order diffracted rays B and C are reflected into the substrate S at a possibly different polar angle of reflection and do not remain in the plane of incidence. Thus, the rays A and B have non-zero azimuthal angles $\phi$ and polar angles $\theta$ defined by the rules of conical diffraction.

For a linear grating in the xy-plane, conical diffraction occurs when an input ray's plane of incidence does not include the grating vector. According to the paper "Description of Diffraction Grating Behavior in Direction Cosine Space" by James E. Harvey, and Cynthia L. Vernold, Applied Optics, Vol. 37, Iss. 34, pp. 8158-8160 (1998), which is hereby incorporated by reference, the diffracted rays for non-zero orders are not in the plane of incidence formed by the input ray vector R and the normal N to the plane of the linear grating. A right-handed coordinate system can be defined that is centered on the intersection point of the input ray with the plane of the grating and oriented so that the grating's normal vector is along the z-axis. Then, the x- and y-coordinates of the $m^{th}$ order diffracted ray projected onto the xy-plane are given by the equations $$x_m = \left(\frac{m\lambda}{d}\right)\cos(\kappa) - [\sin(\theta_{in})\cos(\phi_{in})],$$

$$y_m = \left(\frac{m\lambda}{d}\right)\sin(\kappa) - [\sin(\theta_{in})\sin(\phi_{in})],$$

where m=0, +1, +2 . . . indicates the diffraction order, $\lambda=\lambda_0/n_{in}$ is the effective wavelength of the light ray R traveling through the waveguide substrate S, $n_{in}$ is the substrate material's index of refraction, $\lambda_0$ is the wavelength of the light ray R in vacuum, d is the grating's pitch, $\kappa$ is the angle of the grating vector k with respect to the positive x-axis direction, $\theta_{in}$ is the polar angle that the incident ray makes with respect to the z-axis (the grating's normal), and $\phi_{in}$ is the azimuth angle that the projection of the incident ray makes with respect to the x-axis in the xy-plane. For the case that the incident ray is in the xz-plane, coming from the −x-axis toward the +x-axis direction, the azimuth angle $\phi_{in}$ will be zero, i.e., $\phi_{in}=0$.

The following condition that ensures that the diffracted ray is real (as opposed to an evanescent ray):

$$r^2 \equiv x_m^2 + y_m^2 \leq 1,$$

The method of design of the turning optic TO considers only the diffraction orders m that satisfy this condition. The azimuth angle ($\phi$ out in the xy-plane, with respect to the x-axis, for the $m^{th}$ order diffracted ray is determined by the following relationship:

$$\phi_{out} = \arccos\left(\frac{x_m}{r}\right).$$

In this way, the turning of the diffracted ray, for example of the center ray R of the center pixel among the angularly encoded rays of the image source, can be determined. The polar angle $\theta_{out}$ that the $m^{th}$ order diffracted ray makes with the z-axis is determined by the following relationship:

$$\theta_{out} = \arcsin(r).$$

These equations can be used to advantage to determine the design of linear gratings for conical diffraction.

For setting parameters of the turning optic TO, the polar angle sour of the $1^{st}$ order diffracted axial ray R' (for example, the $1^{st}$ order diffracted ray of a center pixel among the angularly encoded rays of the image source) is arranged to remain the same, or nearly the same, as the incident axial ray R polar angle $\theta_{in}$ approaching the diffractive optic, for example the turning optic TO. In addition, the incident axial ray R approaching the diffractive optic, for example turning optic TO of FIG. 4A, is oriented approximate the optimal TIR angle $\theta_O$. The equations of conical diffraction can be arranged for guiding the design of the diffraction gratings to achieve the special case that the polar angle $\theta_{out}$ of the $1^{st}$ order diffracted axial ray R' remains the same as the incident axial ray R polar angle $\theta_{in}$, i.e., $\theta_{out}=\theta_{in}$. Solving for the grating pitch, d, the following two equations can be developed:

$$d = \frac{m\lambda\cos(\kappa)}{\sin(\theta_{in})[\cos(\phi_{out}) + \cos(\phi_{in})]}$$

$$d = \frac{m\lambda}{2\sin(\theta_{in})[\cos(\kappa)\cos(\phi_{in}) + \sin(\kappa)\sin(\phi_{in})]}.$$

Combined, two equations express the following relationship:

$$\frac{\cos(\kappa)}{\cos(\phi_{out}) + \cos(\phi_{in})} = \frac{1}{2[\cos(\kappa)\cos(\phi_{in}) + \sin(\kappa)\sin(\phi_{in})]}.$$

Since the coordinate system can be arbitrarily oriented in the xy-plane at the point of the ray R's intersection with the turning optic TO (z-axis is along the normal vector N of the waveguide 40 and turning optic TO) the condition that $\phi_{in}=90°$ can be established at the point of intersection. The orientation of the turning optic, K, is then related to the azimuthal angle $\phi_{out}$ of the diffracted ray R' by the following expression:

$$\sin(2\kappa) = \cos(\phi_{out})$$

Following this relationship in the design and orientation of, e.g., the turning optic TO of FIG. 4A, ensures that the $1^{st}$ order diffracted axial ray R' remains at the optimal TIR polar angle $\theta_O$, that is $\theta_{out}=\theta_{in}=\theta_O$, and, therefore, the range of angularly encoded beams remains within the parameters of the waveguide, i.e., $\theta_C < \theta_I < \theta_E$ and diffraction efficiency is maintained.

Previous output grating ODO designs, such as shown in FIG. 2 required the grating pitch of the out-coupling grating ODO to match the grating pitch of the in-coupling grating IDO. This common grating pitch was used to ensure that the relative angles among the angularly related input beam, which are encoded by the in-coupling diffractive optic IDO, match the relative angles among the decoded angularly related beams output from the out-coupling diffractive optic ODO. In a broader sense as contemplated herein, whether any symmetries are maintained or not among the turning optic TO and the in-coupling and out-coupling diffractive optics IDO and ODO or whether or not any change to the encoding of the angularly related beams of the image-bearing light WI takes place along the planar waveguide 22, the turning optic TO and the in-coupling and out-coupling diffractive optics IDO and ODO are preferably related so that the image-bearing light WO that is output from the planar waveguide 22 preserves or otherwise maintains the original or desired form of the image-bearing light WI for producing the intended virtual image with the overlapping image bearing light beams WO. The embodiment herein described removes this constraint to the design of the out-coupling grating as well as any restriction that the axial ray representing the center pixel among the angularly encoded rays of the image source be perpendicular to the in-coupling diffractive optic.

Figure 5A:
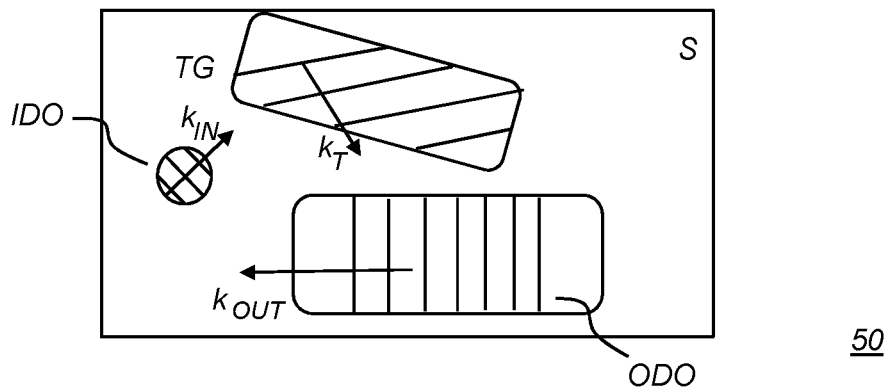
FIG. 5A shows one possible arrangement of the in-coupling, turning, and out-coupling diffractive optics with the grating vectors.

FIG. 5A is a top view of an image light guide 50 comprising an in-coupling diffractive optic IDO, a turning optic TO and an out-coupling diffractive optic ODO. The in-coupling diffractive optic IDO has an associated grating vector $k_{IN}$. Grating vector $k_{IN}$ can be mathematically expressed as $$k_{IN} + \frac{2\pi}{\Lambda_{IN}} \hat{k}_{IN}$$

where $\Lambda_{IN}$ is the pitch of the in-coupling diffractive optic IDO and $\hat{k}_{IN}$ is a unit vector in the direction of the grating vector $k_{IN}$. The turning diffractive optic TO has a grating vector $k_T$. Grating vector $k_T$ can be mathematically expressed as $$k_T = \frac{2\pi}{\Lambda_T} \hat{k}_T$$

where $\Lambda_T$ is the pitch of the turning diffractive optic TO and $\hat{k}_T$ is a unit vector in the direction of the grating vector $k_T$. The out-coupling diffractive optic ODO has a grating vector $k_{OUT}$. Grating vector $k_{OUT}$ can be mathematically expressed as $$k_{OUT} = \frac{2\pi}{\Lambda_{OUT}} \hat{k}_{OUT}$$

where $\Lambda_{OUT}$ is the pitch of the out-coupling diffractive optic ODO and $\hat{k}_{OUT}$ is a unit vector in the direction of the grating vector $k_{OUT}$.

The design of the diffractive gratings IDO, TO, and ODO, according to the present invention, are such that no single grating vector length need equal the length of any of the other grating vectors. It is an object of this invention that optimum performance of image light guide 50 for conveying an input image and forming an eyebox E for viewing the virtual image requires that the design of the three diffraction gratings IDO, TO, ODO be such that $$\frac{2\pi}{\Lambda_{IN}} \hat{k}_{IN} + \frac{2\pi}{\Lambda_T} \hat{k}_T + \frac{2\pi}{\Lambda_{OUT}} \hat{k}_{OUT} = \vec{0}$$

holds or approximately holds to substantially zero. That is, while the three grating vectors $k_{IN}$, $k_T$, and $k_{OUT}$ preferably sum to a magnitude approaching zero, some tolerance is necessary to accommodate manufacturing practicalities within the tolerance for preserving desired image quality.

Figure 5B:
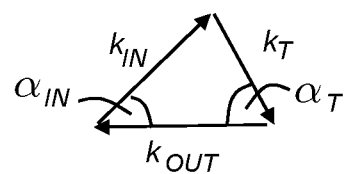
FIG. 5B is an illustrating showing the grating vectors.

FIG. 5B is a representation of the diffraction grating vectors $k_{IN}$, $k_T$, and $k_{OUT}$ forming, in general, a scalene triangle. In FIG. 5B, angle $\alpha_{IN}$ is the angle between the in-coupling grating vector $k_{IN}$ and the out-coupling grating vector $k_{OUT}$, and $\alpha_T$ is the angle between the turning optic grating vector $k_T$ and the out-coupling grating vector $k_{OUT}$. The design of the turning grating is then best accomplished by using the relation $$\Lambda_T = -\frac{\sin(\alpha_T)}{\sin(\alpha_{IN})} \Lambda_{IN}$$

where the $\alpha_T$ is best determined by the relation $$\tan(\alpha_T) = \frac{\sin(\alpha_{IN})}{\cos(\alpha_{IN}) - \Lambda_{IN}/\Lambda_{OUT}}$$

These equations, for the optimal design of the turning optic TO, can be combined to produce the single equation for the optimal design of the turning optic TO, $$\Lambda_T = \frac{\Lambda_{IN}}{\sqrt{1 - 2\cos(\alpha_{IN})\frac{\Lambda_{IN}}{\Lambda_{OUT}} + \frac{\Lambda_{IN}^2}{\Lambda_{OUT}^2}}}$$

The parameters of the in-coupling diffractive optic IDO can be set to assure that the polar angles of the range of angularly encoded beams diffracted into the waveguide remain within the desired range of TIR angles satisfying the relationship: $\theta_C < \theta_I < \theta_E$. Two other conditions for this more generalized case include arranging the turning optic as described above so that the central polar angles $\theta_{out}$ our diffracted from the turning optic remain centered about the polar angle $\theta_O$ and the grating vectors of the in-coupling diffractive optic, the turning optic, and the out-coupling diffractive optic sum to zero.

The in-coupling diffractive optic is preferably arranged to diffract a selected central ray corresponding to an angularly encoded beam representing a pixel near the center of the virtual image at an optimal polar angle $\theta_O$ that bifurcates or is at least near the center of the acceptable range of polar angles from $\theta_C$ to $\theta_E$. The turning diffractive optic, i.e., the turning optic, is preferably oriented on the planar waveguide with respect to the in-coupling diffractive to direct the angularly encoded beams toward a desired location of the out-coupling diffractive optic. Preferably, the pitch of the turning optic is calculated so that the polar angle $\theta_{out}$ out at which the selected center ray is diffracted from the turning optic remains substantially equal to the optimal the polar angle $\theta_O$. In this way, the range of angularly encoded beams propagating along the waveguide from the diffractive turning optic to the out-coupling diffractive optic continue to satisfy the relationship: $\theta_C < \theta_I < \theta_E$. With the orientation and grating pitch of the in-coupling diffractive optic and the turning optic decided in accordance with the rules for conical diffraction. The orientation and length or their respective grating vectors are also known. To preserve the initial angular encoding of the angularly related beams intended to form the enlarged pupil of the eyebox, the sum of the grating vectors of the out-coupling diffractive optic and the turning optic is preferably the negative of the grating vector of the in-coupling diffractive optic of so that the components of all three vectors sum to substantially zero.

Despite these constraints, design freedoms remain including the chosen orientation of non-normal inputs to the image light guide, which can be used to optimize orientations of the waveguide to both the viewer and the image generator. The in-coupling and out-coupling diffractive optics can also be arranged as reflective or transmissive diffractive optics in accordance with their positions on the waveguide surfaces, and the distances between the diffractive optics can also be varied.

While various embodiments have been described in detail, variations and modifications can be made within the spirit and scope of the teaching. The presently disclosed embodiments are therefore considered in all respects to be illustrative and not restrictive.

The invention claimed is:

1. An image light guide for conveying a virtual image, comprising:
   a waveguide having a transparent substrate and inner and outer surfaces oriented in parallel to a plane of the waveguide;
   an in-coupling diffractive optic positioned on or within the waveguide, wherein the in-coupling diffractive optic is operable to diffract a range of angularly related image-bearing light beams into the waveguide;
   an out-coupling diffractive optic positioned on or within the waveguide, wherein the out-coupling diffractive optic is operable to diffract at least a portion of the image-bearing light beams from the waveguide toward an eyebox; and
   a turning diffractive optic positioned on or within the waveguide, wherein the turning diffractive optic is operable to diffract the image-bearing light beams propagating from the in-coupling diffractive optic toward the out-coupling diffractive optic;
   wherein each of the in-coupling diffractive optic, the turning diffractive optic, and the out-coupling diffractive optic comprise a periodic array of features and define a grating vector in the plane of the waveguide, each grating vector having an orientation normal to the periodic array of features and a length that is inversely proportional to a pitch of the periodic array of features;
   wherein the grating vectors of the in-coupling and the out-coupling diffractive optics have different lengths;
   wherein the grating vectors of the in-coupling diffractive optic, the turning diffractive optic, and the out-coupling diffractive optic sum to substantially zero; and
   wherein the in-coupling diffractive optic diffracts at least a portion of the range of angularly related image-bearing light beams into the waveguide for propagation as an encoded set of angularly related beams within a limited range of angles of incidence with the inner and outer surfaces of the waveguide, and the turning diffractive optic diffracts at least a second portion of the range of angularly related image-bearing light beams substantially within the range of angles of incidence with the inner and outer surfaces of the waveguide.

2. The image light guide of claim 1, wherein each of the grating vectors of the in-coupling diffractive optic, the turning diffractive optic, and the out-coupling diffractive optic have different lengths.

3. The image light guide of claim 1, wherein:
   the grating vector $k_{IN}$ of the in-coupling diffractive optic is defined mathematically as:

$$k_{IN} = \frac{2\pi}{\Lambda_{IN}} \hat{k}_{IN}$$

where $\Lambda_{IN}$ is the pitch of the in-coupling diffractive optic and $\hat{k}_{IN}$ is a unit vector in the direction of the grating vector $k_{IN}$, the grating vector $k_T$ of the turning diffractive optic is defined mathematically as:

$$k_T = \frac{2\pi}{\Lambda_T} \hat{k}_T$$

where $\Lambda_T$ is the pitch of the turning diffractive optic and $\hat{k}_T$ is a unit vector in the direction of the grating vector $k_T$, the grating vector $k_{OUT}$ of the out-coupling diffractive optic is defined mathematically as:

$$k_{OUT} = \frac{2\pi}{\Lambda_{OUT}} \hat{k}_{OUT}$$

where $\Lambda_{OUT}$ is the pitch of the out-coupling diffractive optic and $\hat{k}_{OUT}$ is a unit vector in the direction of the grating vector $k_{OUT}$.

4. The image light guide of claim 1, wherein the range of angles of incidence is within a range of polar angles $\theta_I$, wherein $$\theta_C < \theta_I < \theta_E$$

where $\theta_C$ is a critical angle for propagating image-bearing light by total internal reflection along the waveguide, and $\theta_E$ is an extreme polar angle at which rays of one of the encoded set of angularly related image-bearing light beams miss any encounter with the turning diffractive optic or the out-coupling diffractive optic.

5. The image light guide of claim 1, wherein a central ray corresponding to an angularly related beam representing a pixel near a center of the virtual image is diffracted into the waveguide at a polar angle, and the turning diffractive optic is operable to diffract the central ray substantially through the polar angle whereby at least a portion of the central ray is operable to propagate along the waveguide toward the out-coupling diffractive optic.

6. The image light guide of claim 5, wherein the polar angle is derived from the following expression to within a tolerance of plus or minus two degrees:

$$\theta_O = \frac{\theta_C + \theta_E}{2}$$

where $\theta_O$ is the polar angle, $\theta_C$ is a critical angle for propagating image-bearing light by total internal reflection along the waveguide, and $\theta_E$ is an extreme polar angle at which rays of one of the angularly related image-bearing light beams miss the turning diffractive optic or the out-coupling diffractive optic.

7. The image light guide of claim 5, wherein the in-coupling diffractive optic is arranged to diffract the central ray into the waveguide from a non-normal orientation at which the central ray is incident to the waveguide.

8. The image light guide of claim 7, wherein the out-coupling diffractive optic is arranged to diffract the central ray from the waveguide at a corresponding non-normal orientation to the waveguide.

9. The image light guide of claim 5, wherein the polar angle is measured between the central ray and a normal to the inner and outer surfaces of the waveguide within a tolerance of plus or minus two degrees.

10. The image light guide of claim 1, wherein the limited range of incidence angles are within a range of polar angles between a critical angle and an extreme angle,
wherein rays of the encoded set of angularly related beams incident on the inner and outer surfaces of the waveguide at or beyond the critical angle are operable to propagate within the waveguide via total internal reflection, and
wherein rays of the encoded set of angularly related beams incident on the inner and outer surfaces of the waveguide at or beyond the extreme angle do not encounter the turning diffractive optic or the out-coupling diffractive optic.

11. The image light guide of claim 1, wherein at least one of the in-coupling diffractive optic, the turning diffractive optic, and the out-coupling diffractive optic comprises surface relief grating features.

12. The image light guide of claim 1, wherein at least one of the in-coupling diffractive optic, the turning diffractive optic, and the out-coupling diffractive optic comprises a volume hologram.

13. The image light guide of claim 1, wherein at least one of the in-coupling diffractive optic, the turning diffractive optic, and the out-coupling diffractive optic comprises a holographic optical element.

14. An image light guide for conveying a virtual image, comprising:
a waveguide having a transparent substrate and inner and outer surfaces oriented in parallel to a plane of the waveguide;
an in-coupling diffractive optic positioned on or within the waveguide, wherein the in-coupling diffractive optic is operable to diffract a range of angularly related image-bearing light beams into the waveguide;
an out-coupling diffractive optic positioned on or within the waveguide, wherein the out-coupling diffractive optic is operable to expand at least a portion of the image-bearing light beams in at least one dimensions and to direct the expanded image-bearing light beams from the waveguide toward an eyebox;
a turning diffractive optic positioned on or within the waveguide, wherein the turning diffractive optic is operable to diffract the image-bearing light beams propagating from the in-coupling diffractive optic toward the out-coupling diffractive optic;
wherein a central ray corresponding to an angularly related beam representing a pixel near a center of the virtual image is diffracted into the waveguide at a polar angle, and the turning diffractive optic is operable to diffract the central ray substantially through the polar angle whereby at least a portion of the central ray is operable to propagate along the waveguide toward the out-coupling diffractive optic.

15. The image light guide of claim 14, wherein at least one of the in-coupling diffractive optic and the out-coupling diffractive optic comprises a holographic optical element.

16. An image light guide for conveying a virtual image, comprising:
a waveguide having a transparent substrate and inner and outer surfaces oriented in parallel to a plane of the waveguide;
an in-coupling diffractive optic positioned on or within the waveguide, wherein the in-coupling diffractive optic is operable to diffract a range of angularly related image-bearing light beams into the waveguide;
an out-coupling diffractive optic positioned on or within the waveguide, wherein the out-coupling diffractive optic is operable to diffract at least a portion of the image-bearing light beams from the waveguide toward an eyebox;
a turning diffractive optic positioned on or within the waveguide, wherein the turning diffractive optic is operable to diffract the image-bearing light beams propagating from the in-coupling diffractive optic toward the out-coupling diffractive optic;
wherein each of the in-coupling diffractive optic, the turning diffractive optic, and the out-coupling diffractive optic comprise a periodic array of features and define a grating vector in the plane of the waveguide, each grating vector having an orientation normal to the periodic array of features and a length that is inversely proportional to a pitch of the periodic array of features; and
wherein the in-coupling diffractive optic diffracts at least a portion of the range of angularly related image-bearing light beams into the waveguide within a range of angles of incidence with the inner and outer surfaces of the waveguide,
wherein the range of angles of incidence is between a total internal reflection critical angle and a second angle at which rays of the portion of the range of angularly related image-bearing light beams miss any encounter with the turning diffractive optic or the out-coupling diffractive optic, and
wherein a central ray of the portion of the range of angularly related image-bearing light beams representing a pixel near a center of the virtual image is oriented at a polar angle, wherein the polar angle bifurcates the critical angle and the second angle within a tolerance of plus or minus two degrees.

17. The image light guide of claim 16, wherein the polar angle is derived from the following expression to within the tolerance of plus or minus two degrees:

$$\theta_O = \frac{\theta_C + \theta_E}{2}$$

where $\theta_O$ is the polar angle, $\theta_C$ is a critical angle for propagating image-bearing light by total internal reflection along the waveguide, and $\theta_E$ is the second angle, wherein the second angle is an extreme polar angle at which rays of one of the angularly related image-bearing light beams miss the turning diffractive optic or the out-coupling diffractive optic.

18. The image light guide of claim 16, wherein at least one of the in-coupling diffractive optic, the turning diffractive optic, and the out-coupling diffractive optic comprises surface relief grating features.

19. The image light guide of claim 16, wherein the out-coupling diffractive optic is operable to expand at least a portion of the image-bearing light beams in two dimensions.

20. The image light guide of claim 16, wherein the turning diffractive optic is configured to diffract at least a second portion of the range of angularly related image-bearing light beams substantially within the range of angles of incidence with the inner and outer surfaces of the waveguide.

* * * * *